Nov. 2, 1965 H. H. GOLDEN 3,215,849
SPECTROPHOTOMETER WITH MOVABLE CUVETTE UNIT
TO ISOLATE A SINGLE WAVELENGTH
Filed Sept. 5, 1962 2 Sheets-Sheet 1

INVENTOR:
HARRY H. GOLDEN

BY
Stevens, Lehrer & Stevens
ATTORNEYS.

United States Patent Office 3,215,849
Patented Nov. 2, 1965

3,215,849
SPECTROPHOTOMETER WITH MOVABLE CU-
VETTE UNIT TO ISOLATE A SINGLE WAVE-
LENGTH
Harry H. Golden, 2519 N. Elston Ave., Chicago 47, Ill.
Filed Sept. 5, 1962, Ser. No. 221,533
2 Claims. (Cl. 250—234)

My invention relates to spectrophotometers employed for analyzing chemical solutions by means of monochromatic light. While this type of analysis is well-known, the conditions involved and the complicated instrumentalities employed have made such existing apparatus as has come to my attention complex and expensive, and it is therefore one object of the present invention to produce an instrument for the above purpose which dispenses with the use of vacuum tube amplifiers, galvanometers and other accessories of a delicate and costly nature.

A further object is to make the tests stable by feeding a constant, low voltage current to both the exciter lamp and photo-conductive cell of the testing apparatus, whereby to maintain a steady meter setting despite fluctuations in line voltage.

A still further object is to employ a photo-conductive cell which is linearly responsive to, and precisely regulates the current flow in relation to light impinging on it, enabling rugged and comparatively inexpensive meters to be used for reading light values intercepted by the photo-conductive cell.

Another object is to provide an instrument in which the exciter lamp is stationary, but in which a novel and integral unit consisting of the exit slit, cuvette well and photo-conductive cell is movable laterally to isolate a very narrow beam of monochromatic light and allow the same to pass through the aforesaid exit slit and the test tube, and impinge on the photo-conductive cell.

An important object is to employ units of a simple nature in the instrument, and to group them compactly.

A better understanding of the invention may be gained by reference to the accompanying drawings, in which.

Referring specifically to the drawings, 10 denotes the rectangular housing of the instrument, the top 11 thereof having a raised rear section 11a. The housing is mounted on a base plate 12 and removably secured thereto; and the more important instrument components are secured to the base plate 12. Some of these are mounted above the level of the base plate; and a channel-shaped platform 14 is provided to support them, such platform being bolted to the base in the manner indicated at 14a in FIG. 3.

Figure 2:
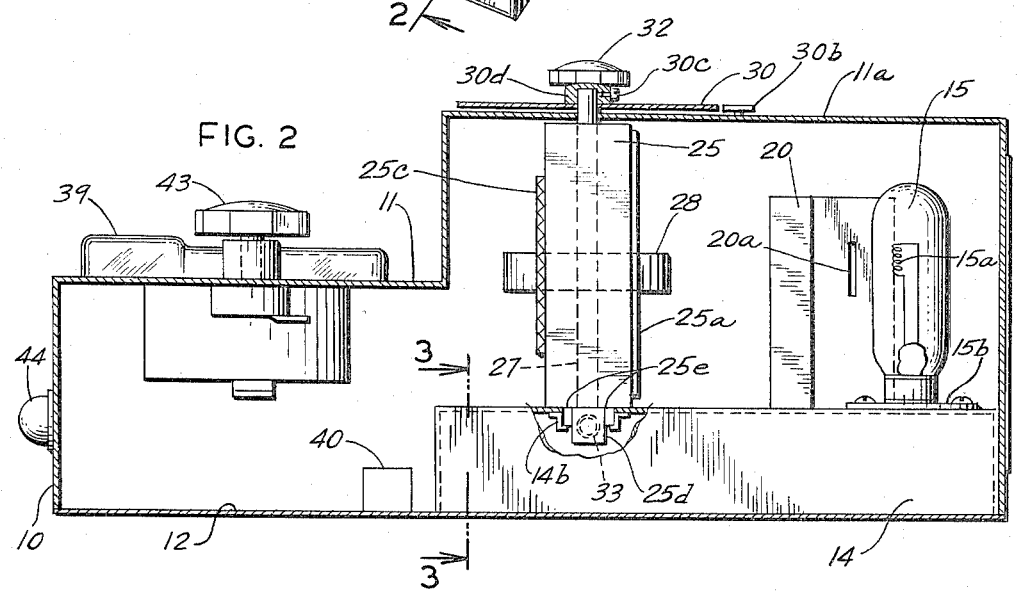
FIG. 2 is an enlarged section on the line 2—2 of FIG. 1.

The rearmost unit mounted on the platform 14 is the exciter lamp 15. FIG. 2 shows that this lamp has a narrow vertical filament 15a. In practice this filament is about 0.3 inch in length; and the pre-focusing socket 15b of the lamp is designed to receive it in an exact position, in order that the filament may be permanently pre-focused.

Figure 4:
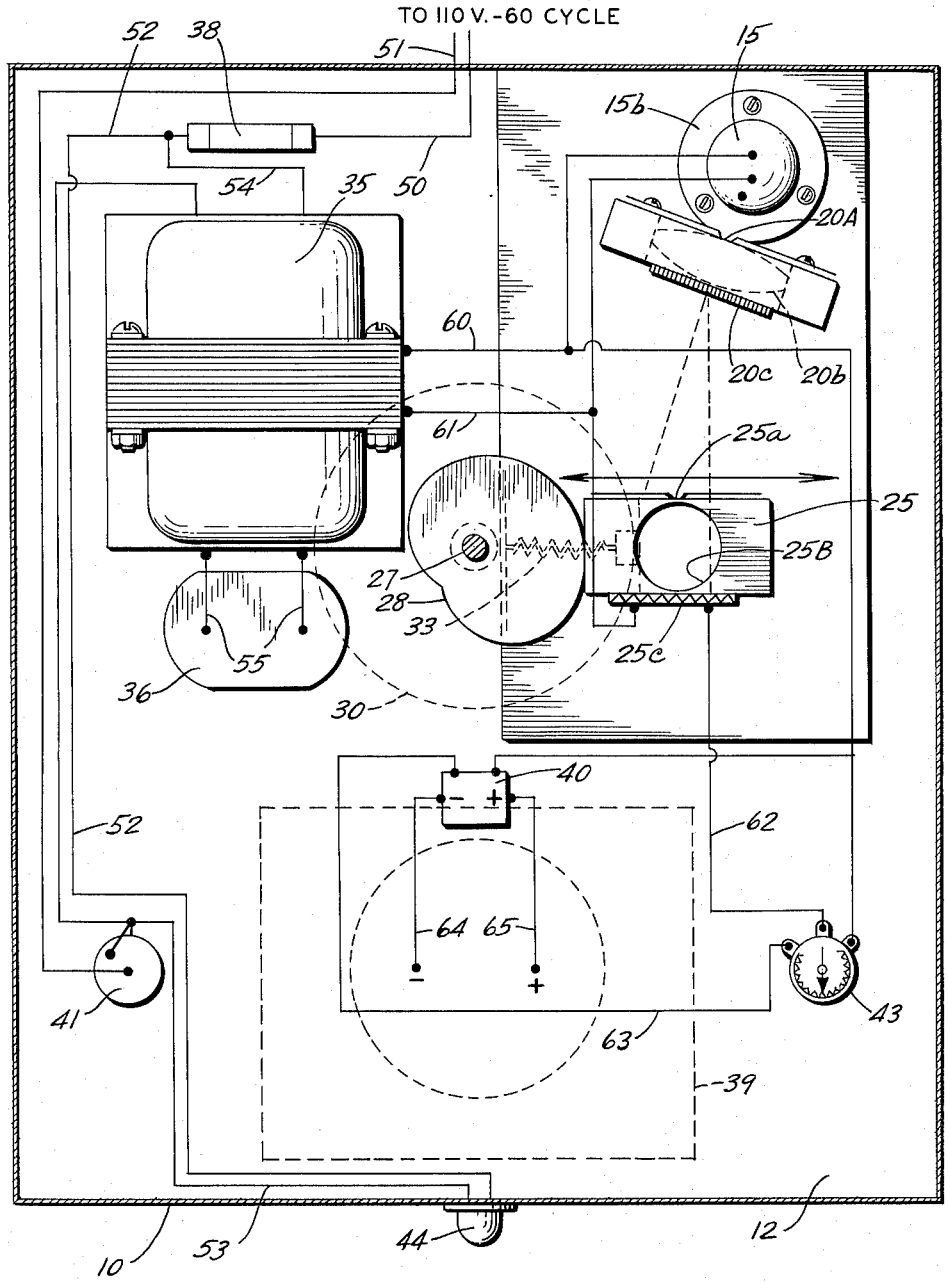
FIG. 4 is a top plan view of the instrument interior from the front, revealing diagrammatically the electric circuit employed in the instrument.

An optical unit 20 is attached to the platform a short distance in front of the lamp 15, and consists of an entrance slit 20a, a lens 20b, and a grating 20c. It is noted that the slit 20a is vertical; and FIG. 4 shows that the lens is aspherical, so that a sharp, narrow white image passes through the slit and the lens when the lamp is in operation. The transmission type replica diffraction grating 20c functions to create a perpendicular true and brilliant spectrum from violet to deep red.

Figure 1:
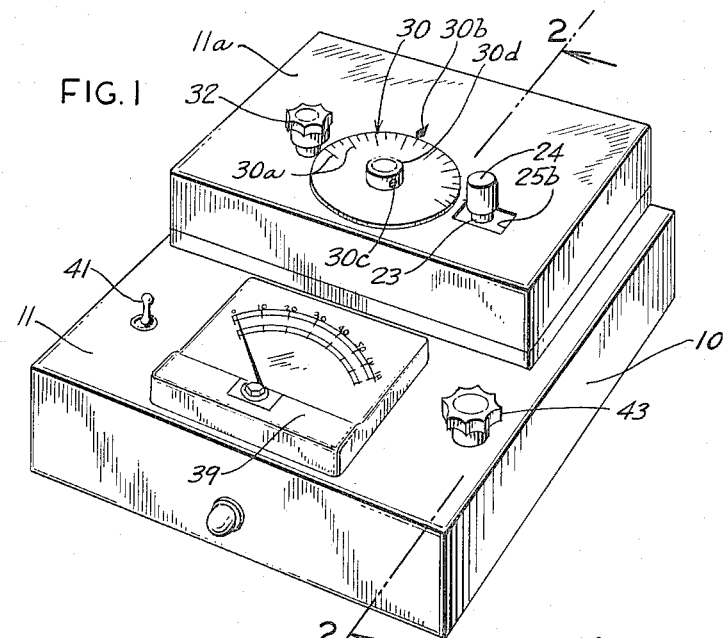
FIG. 1 is a perspective view of the instrument.

Another component at some distance in front of the optical unit 20 is the cuvette well unit 25, which consists of the exit slit 25a, cuvette well 25b and photo-conductive cell 25c. FIG. 1 shows a test tube 23 deposited in the well and closed by a cap 24. It is noted in the upper part of FIG. 4 that the optical unit 20 is at an angle to the cuvette unit, the object of this placement being to compensate for the angle of deviation of light as it passes through the grating.

The cuvette well unit is designed for transverse adjustment in order to isolate a very narrow beam of monochromatic light. The unit has a bottom rib 25d depending through a slot 14b in the platform 14 and receiving side ribs 25e. These seat in angle brackets 14b depending from the top of the platform. The unit is therefore disposed slidably on the platform.

Figure 3:
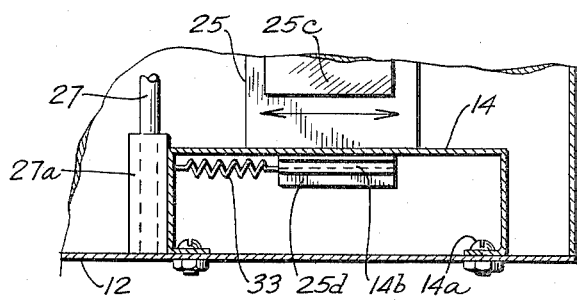
FIG. 3 is a partial section on the line 3—3 of FIG. 2.

A vertical shaft 27 descends through the housing top section 11a, the shaft carrying a cam 28 above the level of the platform. and being journaled in a bearing 27a. A dial 30, graduated in units of wave-length, such as millimicrons 30a, is applied to the shaft on top of the section 11a, the latter having an origin arrow 30b in relation to the dial calibrations; and a lateral knob 32 is mounted in the section 11a for operating the dial by marginal friction. The dial has a knob 30d which is made fast on the shaft by a set screw 30c. FIG. 3 shows that a spring 33 draws the rib 25d in a direction to engage the cuvette well unit endwise with the periphery of the cam 28; and its follows, therefore, that the control of dial 30 adjusts the lateral position of the cuvette well unit by virtue of the curvature of the cam as related to the desired wave-length reading on the dial.

Other components of the instrument comprise a constant voltage transformer 35 coupled with a capacitor 36; a fuse 38 accessory to the transformer; a D.C. meter, such as an ammeter 39 coupled to an instrument rectifier 40; an on-off switch 41; a potentiometer 43; and a glow-type indicator light 44. The transformer, capacitor and fuse are mounted on the base plate 12, while the ammeter, switch, potentiometer and indicator light are carried by the housing 11.

The diagram of the circuit wiring shows that line conductors 50 and 51 enter the housing from the rear, the conductor 50 going to one terminal of the fuse 38, and the conductor 51 extending to one terminal of the on-off switch 41. A conductor 52 goes from the other terminal of the fuse to one terminal of the indicator light 44; and a conductor 53 goes from the other terminal of the latter to the other terminal of the switch 41, continuing to connect with one input terminal of the transformer 35. A short conductor 54 goes from the other input terminal of the transformer to the other terminal of the fuse. Connections 55 couple the transformer with the capacitor 36.

The transformer steps the line current down 8.5 volts, and the output of the transformer enters conductors 60 and 61. Conductor 60 goes to one terminal of the exciter lamp 15, one terminal of the potentiometer 43 and the plus side of instrument rectifier 40 while the conductor 61 goes to the other terminal of the lamp and one terminal of the photo-conductive cell 25c. A conductor 62 goes from the other terminal of the photo-conductive cell to the center terminal of the potentiometer 43; and a conductor 63 goes from the other terminal of the potentiometer to the minus side of the instrument rectifier 40. Finally the conductors 64 and 65 connect the instrument rectifier 40 with the corresponding terminals of the ammeter 39.

The operation of the present spectrophotometer should now be apparent. The first step would be setting the dial 30 at the desired wave-length reading at which the test is to be made. After turning on the exciter lamp a test tube containing the standard or reference solution is deposited in the cuvette unit 25. By means of the potentiometer it is possible to control the setting of the meter 39 to any reading of its dial, such as 100% for transmission determination. Then by substituting a test tube containing the sample solution in the cuvette unit 25 it will be possible to obtain a comparative reading.

The calibration of the instrument can be readily verified by measuring the transmission of a calibrating standard at a stipulated wave-length of say, 610 millimicrons. It has been mentioned that the wave-length dial 30 has a center knob 30d with a set screw 30c to attach the knob to the shaft. By loosening the set screw 30c it is then possible to re-calibrate the setting of the dial with reference to the percent value of the transmission reading on the meter dial.

The features of the invention may be summarized by contrast with prevailing apparatus. Thus, where the exciter lamp is the movable element the factor of inaccuracy is always present; and the frequent movements of the lamp during tests shorten its life. On the other hand, the fixed lamp in the present apparatus makes the pre-focusing of its filament exact and permanent; and the lamp does not require movement for the purposes of the invention. Further, in the present case the use of a constant voltage transformer provides a stable input to the exciter lamp, enabling the meter setting to be steady despite line voltage fluctuations. Also, by feeding the same constant voltage current to the photo-conductive cell both ends of the circuit—that is, the exciter lamp and the photo-conductive cell—are balanced; and the steady current fed to both these units facilitates the accurate setting of the ammeter. Further, where similar apparatus employs photo-voltaic or self-generating cells in conjunction with costly and fragile galvanometers or phototubes, with the necessary amplifying instrumentalities for adaptation to the present type of ammeter, the novel instrument uses a photo-conductive cell which is linearly responsive and by its nature regulates the current flow precisely in relation to light bearing on it. This makes it possible to use rugged and comparatively inexpensive meters. An instrument is thus had which has few components, a high degree of accuracy, and factors which eliminate delicate or expensive accessories.

While I have described the invention along specific lines, various minor changes or refinements may be made therein without departing from its principle. Thus, the constant voltage source need not necessarily be limited to a transformer, since a rechargeable battery or even a dry cell could serve as such a source. I am therefore reserving the right to employ these and other possible modifications which fall within the scope of the appended claims.

I claim:

1. A spectrophotometer including an exciter lamp, an optical unit comprising an entrance slit, a lens and a grating spaced from the lamp in the order named and adapted to project a spectrum of light, and a unitary cuvette unit movable relative to said lamp and optical unit to isolate a selected beam of monochromatic light and composed of an exit slit, cuvette well and photo-conductive cell all spaced from the optical unit in the order named, and means for adjusting the movement of the cuvette unit.

2. A spectrophotometer including an exciter lamp, an optical unit with an entrance slit, a lens and a grating spaced from the lamp in the order named, a cuvette unit composed of an exit slit, cuvette well and photo-conductive cell movable laterally of said lamp and optical unit to isolate a very narrow beam of monochromatic light from a spectrum directed to the exit slit, and a cam lying in a horizontal plane and adapted upon rotation by a shaft to bear against said cuvette unit to move the same as stated, said cuvette unit supporting the exit slit, cuvette well and photo-conductive cell to render them movable as a unit as stated.

References Cited by the Examiner
UNITED STATES PATENTS

| | | | |
|---|---|---|---|
| 1,450,548 | 4/23 | Howard | 250—206 X |
| 1,914,937 | 6/33 | Bodine | 250—237 X |
| 1,954,329 | 4/34 | Schoenberg | 250—237 X |
| 2,339,053 | 1/44 | Coleman | 250—206 X |
| 2,436,104 | 2/48 | Fisher et al. | 88—14 |
| 2,447,985 | 8/48 | Mass | 250—218 X |
| 2,483,876 | 10/49 | Boyer | 250—218 |
| 2,720,810 | 10/55 | Senn | 250—237 |
| 2,832,259 | 4/58 | Merton | 250—237 |
| 2,875,348 | 2/59 | Kazan | 250—206 |
| 2,878,715 | 3/59 | Rhees | 250—218 X |
| 2,889,736 | 6/59 | Borg | 250—218 X |
| 2,898,802 | 8/59 | Ljungberg | 250—218 X |
| 3,039,005 | 6/62 | O'Connell et al. | 250—213 |

RALPH G. NILSON, *Primary Examiner.*

ARCHIE R. BORCHELT, FREDERICK M. STRADER,
*Examiners.*